(12) United States Patent
Mallat et al.

(10) Patent No.: US 8,229,245 B2
(45) Date of Patent: Jul. 24, 2012

(54) METHOD AND APPARATUS FOR SPATIO-TEMPORAL SUBBAND VIDEO ENHANCEMENT WITH SMALL TIME DELAY

(75) Inventors: Stephane Mallat, Paris (FR); Christophe Bernard, Paris (FR); Joan Bruna, Paris (FR); Nicolas Laveau, Paris (FR)

(73) Assignee: Zoran (France), Malakoff (FR)

( * ) Notice: Subject to any disclaimer, the term of this patent is extended or adjusted under 35 U.S.C. 154(b) by 766 days.

(21) Appl. No.: 12/445,044

(22) PCT Filed: Oct. 10, 2006

(86) PCT No.: PCT/IB2006/003895
§ 371 (c)(1),
(2), (4) Date: Apr. 9, 2009

(87) PCT Pub. No.: WO2008/044091
PCT Pub. Date: Apr. 17, 2008

(65) Prior Publication Data
US 2010/0104210 A1    Apr. 29, 2010

(51) Int. Cl.
*G06K 9/40* (2006.01)
(52) U.S. Cl. ........ 382/275; 382/232; 382/260; 382/265; 382/277; 382/279; 382/210; 382/239; 382/247; 375/240.01; 375/240.08; 375/240.1
(58) Field of Classification Search .................. 382/275, 382/232, 260, 265, 277, 279, 210, 239, 247; 375/240.01, 240.08, 240.1
See application file for complete search history.

(56) References Cited

U.S. PATENT DOCUMENTS
7,362,860 B2 * 4/2008 Hayashi .................. 380/210
2005/0100094 A1 * 5/2005 Keesman ................ 375/240.12

FOREIGN PATENT DOCUMENTS
WO    00/04404 A    1/2000

OTHER PUBLICATIONS

Jizheng Xu, Ruiqin Xiong, Bo Feng, Gary Sullivan, Ming-Chieh Lee, Feng Wu and Shipeng Li, 3D Sub-band Video Coding Using Barbell Lifting, ISO/IEC JTC1/SC29/WG11 MPEG2004/M10569/S05, Munich, pp. 1-13, Mar. 2004.
J. Hartung, Implementation of Three-Dimensional Sub-Band Filters on the Video Array Processor, Institute of Electrical and Electronics Engineers, pp. 2320-2323, 1992.
Erwan Le Pennec and Stephane Mallat, Sparse Geometric Image Representations with Bandlets, IEEE Transactions on Image Processing, pp. 423-438, vol. 14, No. 4., Apr. 2005.
Stephane Mallat, A Theory for Multiresolution Signal Decomposition: The Wavelet Representation, IEEE Transactions on Pattern Analysis and Machine Intelligence, pp. 674-693, vol. 11, No. 7., Jul. 1989.
International Search Report in corresponding International Application No. PCT/IB2006/003895 dated, Mar. 7, 2007.

* cited by examiner

*Primary Examiner* — Mike Rahmjoo
(74) *Attorney, Agent, or Firm* — Lando & Anastasi, LLP (57) ABSTRACT

Video processing method and means for enhancing a video stream, by computing transform coefficients using a spatio-temporal transform comprising a spatial subband transform and a causal time wavelet transform performing filterings with multiscale causal wavelets, modifying the transform coefficients with a nonlinear processing, and computing a processed video stream from the modified transform coefficients using a spatio-temporal reconstruction transform comprising an inverse subband transform and a short delay inverse time wavelet transform, where the short delay inverse time wavelet transform is implemented with wavelet filters modified with window functions to control the processing delay of the entire video processing method.

19 Claims, 10 Drawing Sheets

METHOD AND APPARATUS FOR SPATIO-TEMPORAL SUBBAND VIDEO ENHANCEMENT WITH SMALL TIME DELAY

BACKGROUND OF INVENTION

The present invention relates generally to a video enhancement method, apparatus and computer program, and in particular to a method, apparatus and computer program useful for enhancing the visual quality of videos.

The acquisition process of a video stream often introduces distortions and noise. Video camera introduce electronic noise and blur due to imperfect optics. Other videos such as medical X rays or infra-red videos have other types of noise and the resolution is limited by the acquisition process. In addition, distortions may also be introduced by digital video compression. For example, MPEG 2 or MPEG 4 compression standards introduce block effects and mosquito noise that reduce the video quality. Transport of video over analog channels also incorporates noise into the video signal.

Video noise and compression artifacts can be attenuated with a linear filtering in space and time but this process introduces blur along sharp transitions and fast moving objects. The enhancement process of a video must introduce a limited time delay in most applications. In television, medical and military applications, it may even be necessary to use causal procedures that only process past images in order to restore a video with nearly no delay. Recursive time filters are generally used for this purpose.

To reduce the blur introduced by linear filters, adaptive filtering techniques have been introduced. A parameter adjustment of the time recursive filters is incorporated in order to reduce the averaging when the scene is moving. This parameter adjustment can be incorporated in the more general framework of a Kalman filtering. However, there is no sufficiently reliable model of video images that allows to find robust parameter adjustment procedures. As a result, the range of adaptivity is often small in order to avoid making important errors. Moreover, the parameter adjustment does not take into account the joint time and space image properties.

For an image, efficient adaptive noise removal algorithms are implemented with thresholding strategies applied to the output of a subband transform such as a wavelet transform, or a wavelet packet transform or a bandlet transform. Thresholding subband images is equivalent to adaptively average the input image where there is no sharp transition. Blur removal can also be implemented with a sharpening which increases the amplitude of high frequency subband images, with parameters that depend upon the blur.

For videos, a spatio-temporal subband transform, with a combination of a spatial wavelet transform and a time wavelet transform, replaces the subband transform used for images. Non-linear operators such as thresholding operators are applied to the resulting spatio-temporal subband images and an enhanced video image is reconstructed by combining an inverse time wavelet transform and an inverse spatial subband transform. Such algorithms adaptively remove the noise depending upon the local sharpness and motion of video structures. However, state of the art video processing methods use a combination of a time wavelet transform and an inverse time wavelet transform that introduces a time delay that is typically equal to the maximum time support of multiscale wavelets. To take advantage of time redundancy, this maximum time support must be sufficiently large but this produces a large time delay. The resulting delay is often too large for real-time video enhancement applications, in particular when delays close to zero are required.

Accordingly, there exists a need in the art for improving spatio-temporal subband trans-form methods for video enhancement, by introducing a combination of a time wavelet trans-form and an inverse time wavelet transform that produces a delay d that does not depend upon the maximum time support of multiscale wavelets, and which can potentially be set to zero for causal video enhancement methods.

In addition, many video sources (and in particular medical X-ray video images or defense and security night-vision video images) have a dynamic range that cannot be displayed on the available displays, and applying a sharpening process is useful for increasing the legibility of the video or for making it look nicer. This sharpening process can be applied on a wavelet transform of a video sequence to enhance its local contrast, and there equally exists a need in the art for improving spatio-temporal transform methods for video sharpening or for a combined video enhancement and sharpening with a limited delay d.

SUMMARY OF THE INVENTION

It is a primary object of the invention to devise a method and means of video processing to perform an enhancement of the video comprising noise removal, blur removal or sharpening with a short time delay d with d a nonnegative integer. In this invention, the video enhancement process comprises a causal spatio-temporal transform, causal non-linear operators and a delay-d spatio-temporal reconstruction. The spatio-temporal transform comprises a causal time wavelet transform performed by filtering in time the video sequence with multiscale causal wavelets, and a spatial subband transform. The delay-d spatio-temporal reconstruction comprises an inverse of the spatial subband transform, and a delay-d inverse of the time wavelet transform. The inverse of the time wavelet transform is implemented using filterings with multiscale reconstruction wavelets that are multiplied with a window function. The window function can either be a function of support [−d,0], or a sum of nonnegative translates of a function of support [−d,0]. This ensures that the delay-d inverse time wavelet transform is an exact inverse of the causal time wavelet transform and that at the same time the processing delay of the whole video processing method is not larger than d. It is possible the choose a delay d=0 or a positive delay. The causal non-linear operators can be thresholding operators applied coefficient by coefficient, or deblurring or enhancement operators, or any combination thereof.

The spatio-temporal transform can be implemented by performing first a causal time wavelet transform and then a spatial subband transform. The spatio-temporal reconstruction transform can be implemented in several ways. In particular, it can be implemented with a sequence of an inverse time wavelet transform followed by a inverse spatial subband transform. Also, the spatio-temporal reconstruction transform can comprise additional spatial nonlinear operators inserted after the inverse time wavelet transform and spatial subband transform. The spatio-temporal reconstruction is thus not called an inverse spatio-temporal transform, as it may incorporate non-linear processing steps so that it is not in all cases a substantial inverse of the spatio-temporal transform.

The spatial subband transform can be chosen among a variety of known transforms, like for example a discrete wavelet transform, a dyadic wavelet transform or a bandelet transform.

In an exemplary embodiment, the multiscale causal wavelets used in the causal time wavelet transform comprises boundary wavelets designed for a biorthogonal wavelet transform on [0,+∞), as described by Anderson, Hall, Jawerth and Peters. In yet another exemplary embodiment, the multiscale causal wavelets comprise Haar wavelets.

In an exemplary embodiment of the invention, the multiscale causal wavelets are Haar wavelets, and the causal time wavelet transform is computed recursively for each scale using multiscale averages, and using multiscale weighted differences.

The invention also includes a video scaling apparatus, comprising computer means arranged to carry out a method as disclosed above.

The invention also includes a computer program product, comprising instructions to carry out a method as disclosed above, when the program is run in a computer processing unit.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

Input Video Stream and Enhanced Video Delayed by d Images

Figure 1:
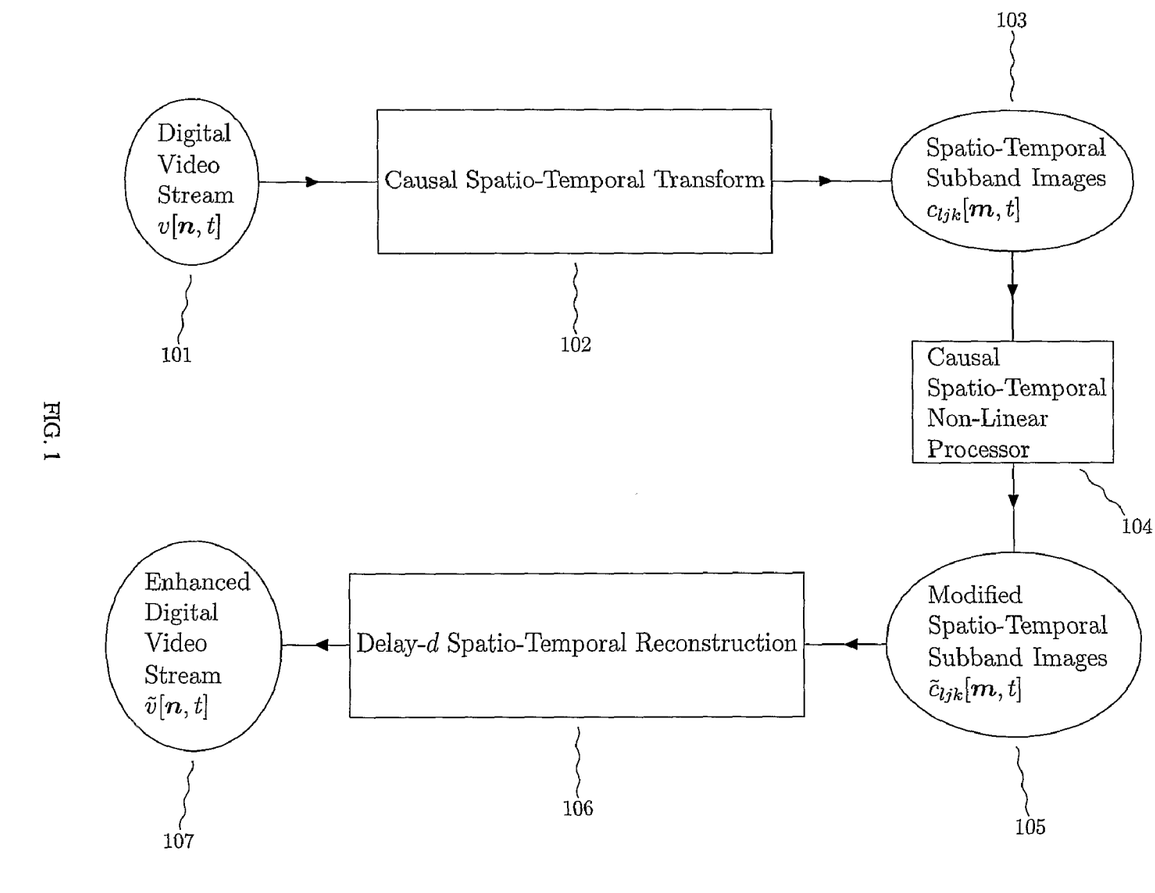
FIG. 1 shows, in block diagram form, an exemplary embodiment of the invention which takes in input a video stream and computes an enhanced output video with a small time delay.

FIG. 1 shows a system exemplifying the present invention. It takes in input a digital video stream (101) which is a sequence indexed by an integer temporal coordinate t, of frames indexed by integer spatial coordinates $n=(n_1,n_2)$. The video pixel values are denoted $v[n,t]$. The video frames are of size $N_1 \times N_2$ so the spatial coordinates $n_1$ and $n_2$ lie respectively in $[1, N_1]$ and $[1, N_2]$.

In the present invention, the images of the digital video stream are fed to the system depicted in FIG. 1 in the order of their time indexes t. The system of FIG. 1 processes this digital video stream (101) on line, which means that it processes each image in turn as soon as it is fed into the system, and outputs an enhanced video stream (107) of pixel values $\tilde{v}[n,t]$ with an image delay d: at time t, after a new input image $v[n,t]$ has been fed, the system outputs the enhanced image of time index t−d of values $\tilde{v}[n,t-d]$ and is an enhanced version of the input image at time t−d of values $v[n,t-d]$.

Note that in the present invention, the processing is said to have a delay of d frames if it is necessary to have received a frame at time index t to be able to compute an output frame at time index t−d. In practice, implementation constraints impose an additional delay of typically a fraction of a frame. This fraction depends on the spatial span of the entire processing and is not evaluated here. One thus has to expect

System Overview

Figure 2:
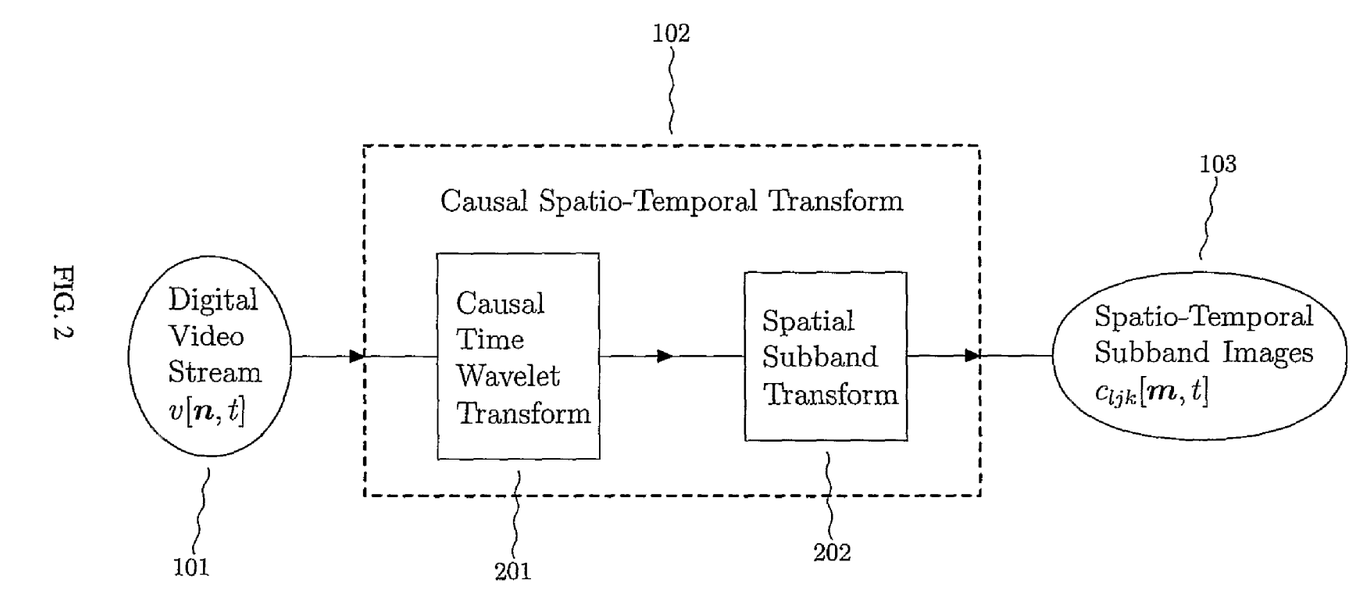
FIG. 2 shows, in block diagram form, an exemplary embodiment of a causal spatio-temporal transform.

In FIG. 1, the causal spatio-temporal transform (102) takes in input a digital video stream (101) of samples $v[n,t]$ to perform a spatial and temporal decorrelation of the input video and compute spatio-temporal subband images (103) of coefficients $c_{l,j,k}[m,t]$. The spatio-temporal transform is causal, which means that to compute a coefficient $c_{l,j,k}[m,t]$, only samples $v[n,t']$ with $t' \leq t$ are needed. In an exemplary embodiment, the causal spatio-temporal transform (102) is implemented with a spatial subband transform, followed by a causal time wavelet transform. A preferred embodiment is illustrated in FIG. 2, wherein the causal spatio-temporal transform (102) is implemented with a causal time wavelet trans-form (201) followed by a spatial subband transform (202). The indexes l,m denote spatial transform indexes, whereas j, k, t denote temporal transform indexes. Typically, l is a scale and orientation index (carrying information on the scale and subband number), and m is a spatial position index. j is a temporal scale index, and k is a temporal filter shape index.

The spatio-temporal subband images (103) are then processed with a causal spatio-temporal non-linear processor (104) to compute modified spatio-temporal subband images (105) of coefficients $\tilde{c}_{l,j,k}[m,t]$. In an exemplary embodiment, the processor (104) includes thresholding operators to remove noise.

Figure 3:
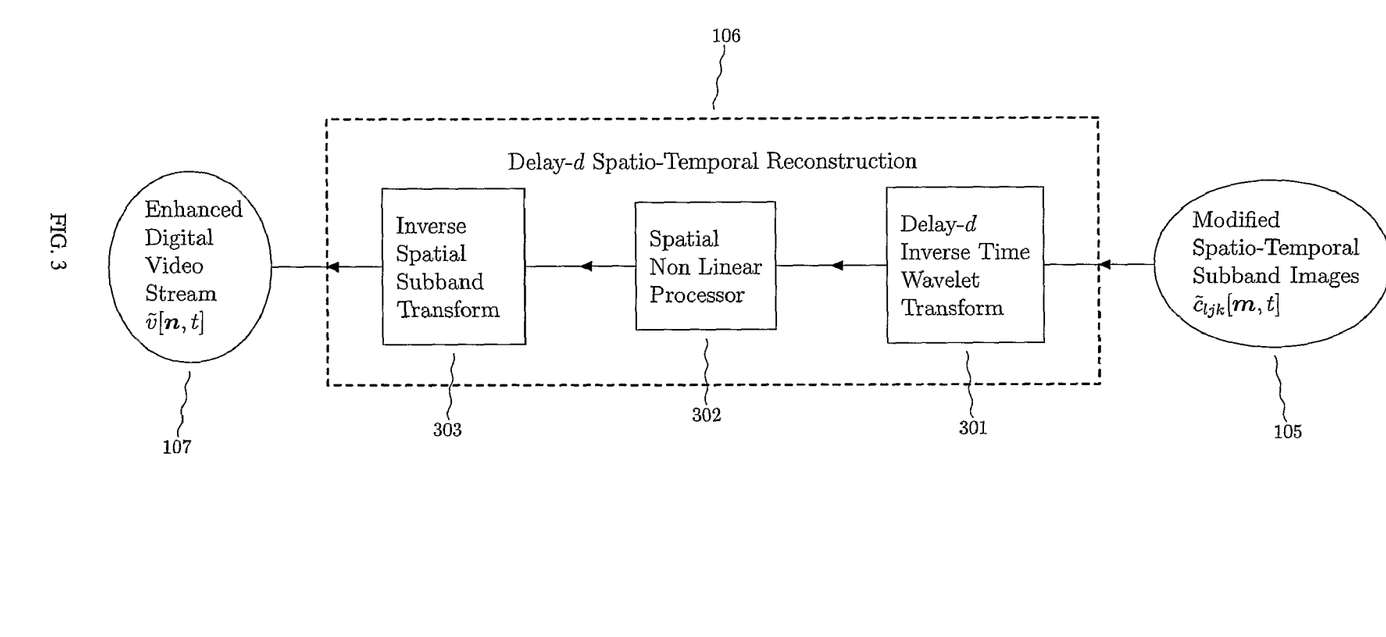
FIG. 3 shows, in block diagram form, an exemplary embodiment of a delay-d spatio-temporal reconstruction.

Then, the delay-d spatio-temporal reconstruction (106) takes in input the modified spatio-temporal subband images (105) and computes an enhanced video stream (107) of samples $\tilde{v}[n,t]$. In an exemplary embodiment, the delay-d spatio-temporal reconstruction (106) is implemented with a delay-d inverse time wavelet transform, followed by an inverse spatial subband transform. In another exemplary embodiment, the delay-d spatio-temporal reconstruction (106) is implemented with an inverse spatial subband transform, followed by a delay-d inverse time wavelet transform. In either case, the delay-d spatio-temporal reconstruction (106) is a substantial inverse of the causal spatio-temporal transform (102). A preferred embodiment is illustrated in FIG. 3: the delay-d spatio-temporal reconstruction (106) is implemented by a delay-d inverse time wavelet transform (301), followed by a spatial nonlinear processor (302) composed of non-linear operators, followed by an inverse spatial subband transform (303). In this last embodiment, the delay-d spatio-temporal reconstruction (106) is not a substantial inverse of the spatio-temporal transform, because it incorporates in addition nonlinear operators in (302) to enhance the video stream that are intertwined with the spatial and temporal inverse transforms (301) and (303). In yet another exemplary embodiment, the spatial nonlinear processor (302) includes thresholding operators to remove noise, or amplification operators for image sharpening, or a combination thereof.

Within the scope of this invention, the temporal transform (201) and its inverse (301) are performed using filterings along the time axis. Also, the spatial transform (202) and its inverse (303) are performed using filterings along the spatial axes, independently on each image. These operators commute and thus in any chained combination of these operators, the order in which these operators are implemented can be changed without changing the output of said chained combination of operators.

The particular structure of the spatial transforms (202) and (303) as well as that of the temporal transforms (201) and (301) make it possible to describe the temporal transforms as operating on one-dimensional signals that are temporal threads of pixels or coefficients, and the spatial transforms as operating on single images.

For the sake of clarity, the present invention is mostly described with exemplary embodiments using real pixel values (i.e. with a single channel) which is for example the case of grayscale video images. It is however apparent to those skilled in the art that the present invention can be applied to multichannel pixel values like color video images with a variety of standard techniques. For example, a color digital video stream can be considered as a triple of grayscale video streams which can be each separately processed by an instance of the present invention.

The Causal Time Wavelet Transform and its Delay-d Inverse

In FIG. 2, the causal time wavelet transform (201) takes in input digital video images from the digital video stream (101) and outputs temporal subband images of coefficients $d_{j,k}[n,t]$ which are the result of a filtering of the input video images with a multiscale causal wavelet family.

The delay d inverse time wavelet transform (301) is essentially an inverse of the time wavelet transform (201) and takes in input spatio-temporal subband images of coefficients $\tilde{c}_{l,j,k}[m,t]$ and computes spatial subband images $w_l[m,t]$.

As explained in the above section, the time wavelet transform and its inverse operate independently of the spatial coordinate n or m, so this coordinate will be omitted in the description below.

The filtering of the causal time wavelet transform is performed with a state of the art filtering algorithm with a suitable multiscale causal wavelet family. This family is essentially defined by a scale parameter $2^J$ and a family of discrete causal multiscale wavelets $\{\psi_{j,k}\}$ where j is an integer between 1 and J corresponding to the scale $2^j$. The integer k is here to allow a plurality of filters per scale $2^j$ and $k \in [k_j, K_j]$.

This family is chosen in such a way that there exists a corresponding reconstruction wavelet family $\{\hat{\psi}_{j,k}\}$ that satisfies for all d in a predefined interval [0,D] a reconstruction property $$\sum_{j=1}^{J} \sum_{k=k_j}^{K_j} \psi_{j,k}(t+d) \hat{\psi}_{j,k}(-d) = \delta(t) \text{ for all } t \quad (1)$$

where $\delta$ is the Dirac filter, having only one nonzero coefficient equal to 1 at 0.

In a preferred embodiment, the multiscale causal wavelet family is obtained from a biorthogonal wavelet basis of the half-line interval $[0,+\infty)$ as the one constructed by Andersson, Hall, Jawerth and Peters ("Wavelets on Closed Subsets of the Real Line", In Recent Advances in Wavelet Analysis, L. L. Schumaker, G. Webb (eds.), 1994). The family of discrete causal multiscale filters $\{\psi_{j,k}\}$ are the analysis wavelets supported on the half line $[0,+\infty)$, while the reconstruction wavelets $\hat{\psi}_{j,k}$ are defined by reversing the dual wavelets $\tilde{\psi}_{j,k}$ supported on $[0,+\infty)$, i.e. using the formula:

$$\hat{\psi}_{j,k}[n] = \tilde{\psi}_{j,k}[-n]$$

The subset of indexes j,k can be chosen as follows: j is in the interval [1,J], and for each j, only the indexes k for which the support of $\psi_{j,k}$ intersects the interval [0,D] are used. For the sake of simplicity of our notations, the scaling functions and dual scaling functions used in a wavelet transform on the half-line and usually denoted $\phi_{J,k}$ and $\tilde{\phi}_{J,k}$ are noted here $\psi_{J,-1-k}$ and $\tilde{\psi}_{J,-1-k}$. With these notations, nonnegative k indexes denote wavelets and negative k indexes denote scaling functions. Again for the sake of simplicity, we will assume that the subset of indexes k for which the support of intersects the interval [0,D] is an interval $[k_j; K_j]$. Usually, for k larger than some $k_0$, all wavelets $\psi_{j,k}$ have the same shape, i.e. $\psi_{j,k}[t] = \psi_{j,k_0}[t - 2^j(k-k_0)]$, which allows to reduce significantly the amount of computations required in the causal time wavelet transform and its delay-d inverse. On the other hand, wavelets $\psi_{j,k}$ for $k < k_0$ have a support which includes the boundary point $\{0\}$. They all have different shapes, and are named "boundary wavelets".

In another exemplary embodiment, the $\psi_{j,k}$ wavelets are multiwavelets wherein j is a scale index and k is a wavelet shape index.

The causal time wavelet transform $d_{j,k}[t]$ of a signal $s[t]$ is obtained by filtering s with the multiscale causal wavelet family $\{\psi_{j,k}\}$ resulting in a time wavelet transform signal $d_{j,k}[t]$:

$$d_{j,k}[t] = s * \psi_{j,k}[t]$$

where * is the convolution operator. As the filters are causal, the computation of all $d_{j,k}[t]$ is possible once $s[t]$ has been received in input. Note that when using biorthogonal wavelets on the half-line as designed by Andersson, Hall, Jawerth and Peters, this is an unusual way of computing a wavelet transform, because usually these wavelets are used to compute scalar products and not convolutions. It is however apparent to those skilled in the art that if the wavelets are chosen accordingly, the convolutions can be computed in an efficient way with filter bank algorithms.

The delay d time inverse wavelet transform reconstructs a signal $s[t]$ from the set of coefficients $d_{j,k}[t]$ as a sum of filtered time wavelet transform signals:

$$s[t] = \sum_{j=1}^{J} \sum_{k=k_j}^{K_j} d_{j,k} * \hat{\psi}_{j,k}^d[t] \quad (2)$$

where the filters $\hat{\psi}_{j,k}^d$ of the reconstruction filter family are defined by $$\hat{\psi}_{j,k}^d = \hat{\psi}_{j,k} \times W$$

with W a windowing function supported in [−d,0] and such that $$\sum_{t=-d}^{0} W[t] = 1.$$

The "×" symbol denotes coefficient-wise multiplication of signals or filters. The reconstructions filters are anti-causal and supported in [−d,0], the delay induced by the reconstruction is thus d. It appears that some filters $\hat{\psi}_{j,k}^d$ are zero filters and can be removed from the reconstruction computation. Note that for large values of d, the delay-d time inverse wavelet transform might be equivalent to a state of the art dyadic wavelet reconstruction transform. However, for values of d typically smaller than the largest support of the dual wavelets, the present transform is substantially different from any state of the art transformation.

In a preferred embodiment, the window function W is defined as $W[t]=1_{[-d,0]}[t]/(d+1)$, where $1\times[t]=1$ if $t \in X$ and 0 else.

Figure 4:
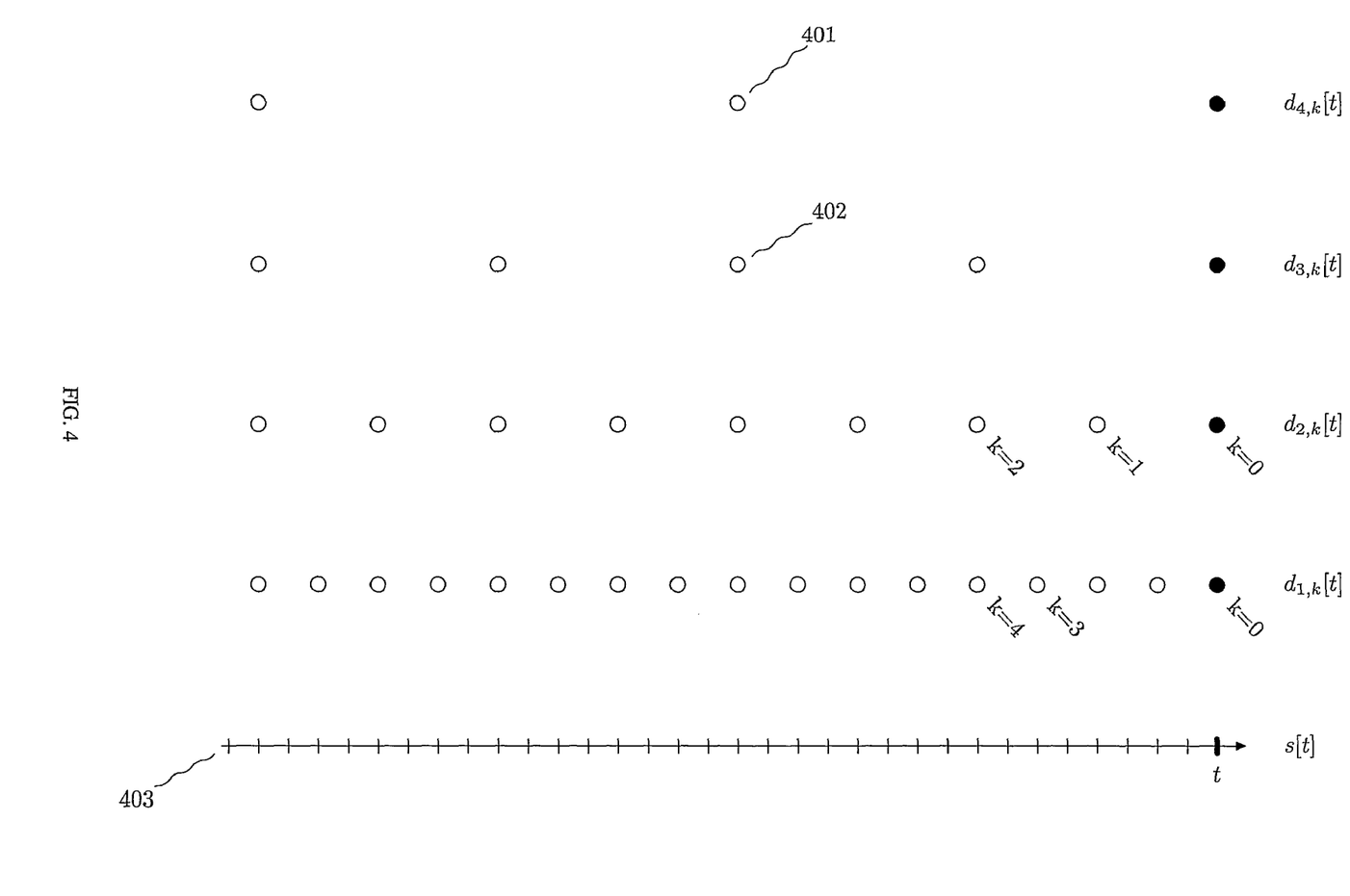
FIG. 4 illustrates a delay-d inverse time wavelet transform, when the wavelets used are the Haar wavelets with a delay d=0.

FIG. 4 illustrates an exemplary embodiment of the inverse delay-0 time wavelet trans-form and the wavelet coefficients involved in the computation of s[t] in the case when the wavelets are Haar wavelets and J=4. Each dot like (401) or (402) represents a wavelet coefficient $d_{j,k}[t]$. As is customary for wavelet transforms, the horizontal coordinate of each dot represents its substantial temporal location $t-k2^j$ and its vertical coordinate its scale j. As a special case, the dots representing coefficients of the largest scale $d_{J,k}[t]$ like (401) also represent a corresponding scaling function coefficient $d_{J,-1-k}[t]$. The horizontal line (403) represents the time line of t instants (one tick per t). The coefficients actually used in the computation of s[t] are black. All others are white. Due to the small support of the Haar wavelet, only one wavelet coefficient per scale j is needed in the computation of s[t] in addition to one scaling function coefficient.

Figure 5:
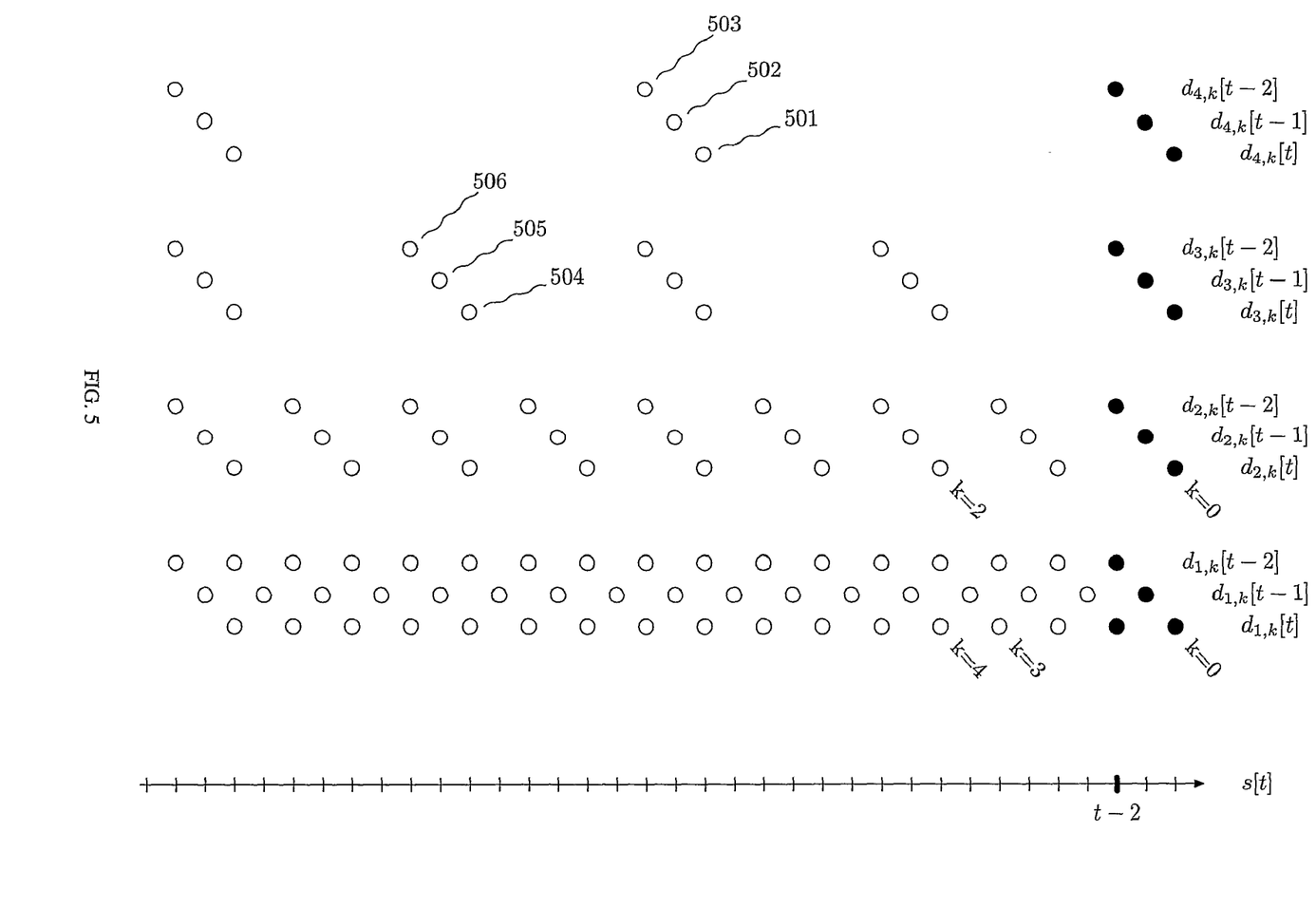
FIG. 5 illustrates a delay-d inverse time wavelet transform, when the wavelets used are the Haar wavelets with a delay d=2.

FIG. 5 illustrates an exemplary embodiment of the inverse delay-d time wavelet trans-form and the wavelet coefficients involved in the computation of s[t−2], performed at time t, when the delay d=2. The samples and coefficients that be computed at time t are displayed, and FIG. 5 shows how the reconstructed sample at time t−2 is computed, thus achieving a delay of 2. The same conventions as in FIG. 4 apply. However, coefficients $d_{j,k}[t-2]$ are represented with a small additional offset to the top to distinguish them from coefficients $d_{j,k}[t]$. The same is done for coefficients $d_{j,k}[t-1]$ for uniformity. As an example, the dots (501), (502) and (503) represent respectively wavelet coefficients $d_{4,1}[t]$, $d_{4,1}[t-1]$ and $d_{4,1}[t-2]$ together with scaling function coefficients $d_{4,-1-1}[t]$, $d_{4,-1-1}[t-1]$ and $d_{4,-1-1}[t-2]$; (504), (505) and (506) represent the wavelet coefficients $d_{3,3}[t]$, $d_{3,3}[t-1]$ and $d_{3,3}[t-2]$. Again the coefficients actually used in the computation of s[t−2] are singularized in black. Three or four wavelet coefficients per scale are used for reconstructing s[t−2].

Figure 6:
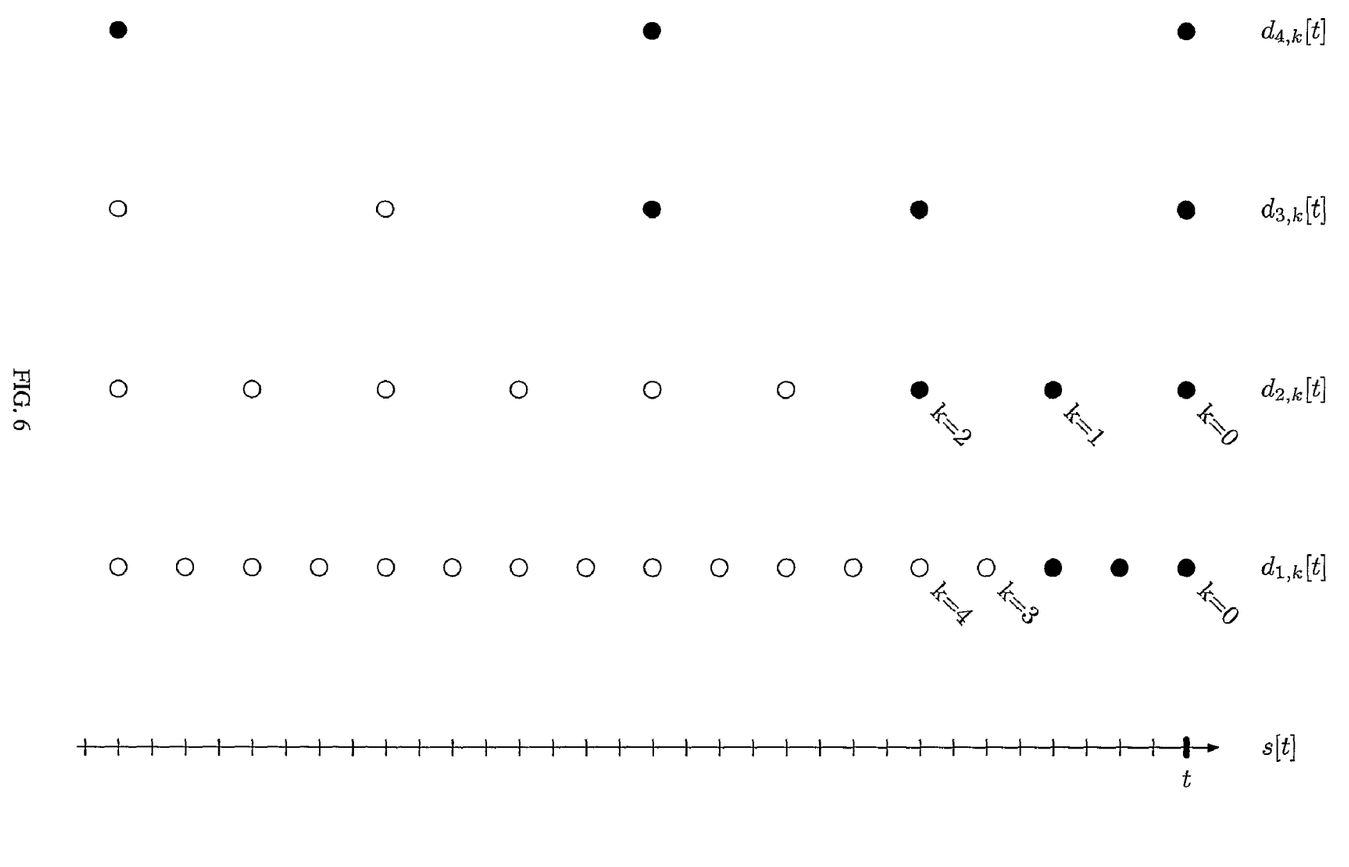
FIG. 6 illustrates a delay-d inverse time wavelet transform with wavelets of support larger than that of Haar wavelets with a delay d=0.

FIG. 6 illustrates an exemplary embodiment of the inverse delay-0 time wavelet trans-form in a case similar to that of FIG. 4, except that the wavelets used have a larger support than the Haar wavelet, so that the number of coefficients used for each scale is larger than 1.

Figure 7:
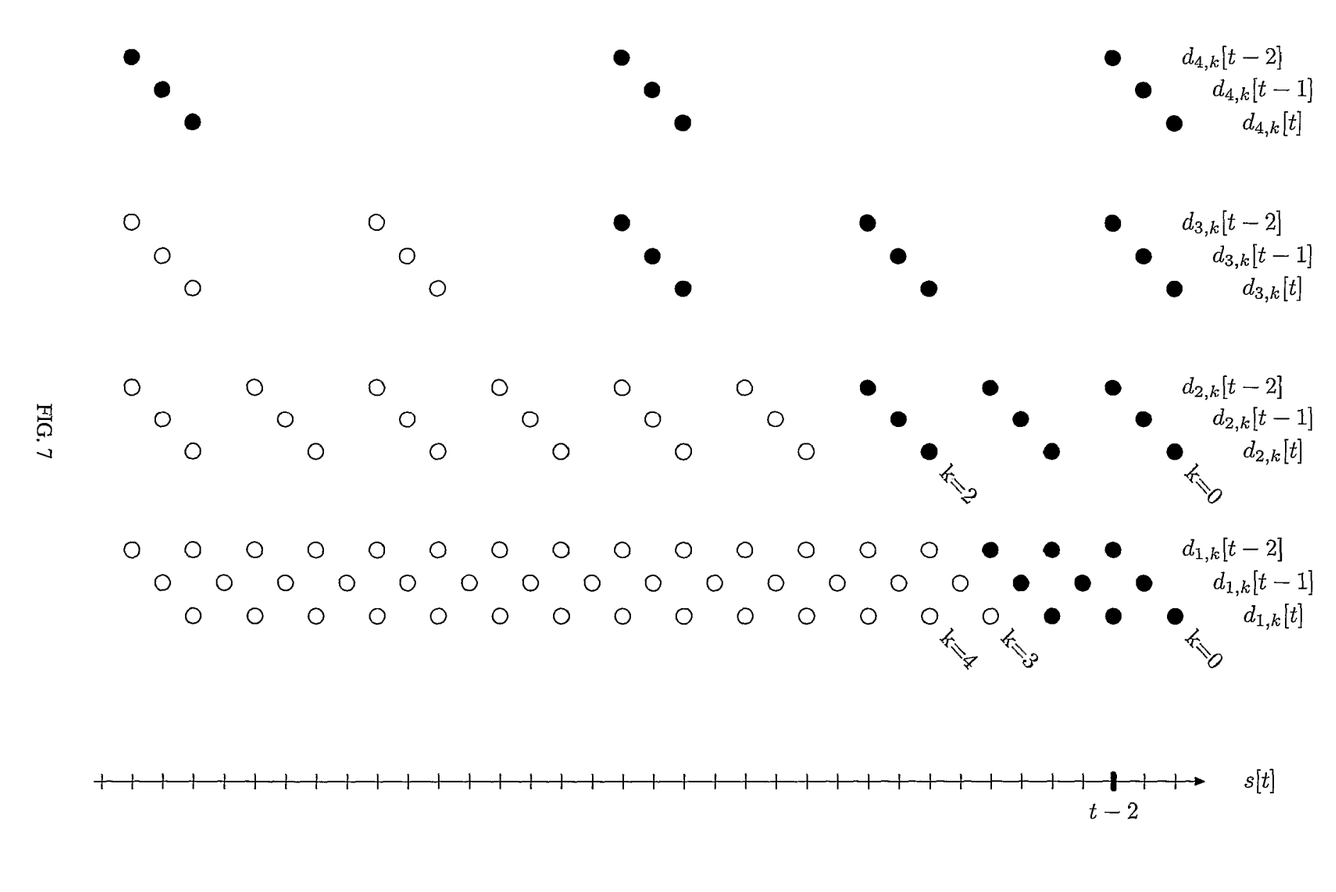
FIG. 7 illustrates a delay-d inverse time wavelet transform with wavelets of support larger than that of Haar wavelets with a delay d=2.

In the same spirit, FIG. 7 illustrates an exemplary embodiment of the inverse time wavelet transform in a case similar to that of FIG. 5 except that the wavelets used have again a larger support than the Haar wavelet.

In a preferred embodiment, if some filters are identical up to a shift, this redundancy is used to reduce the amount of computations required by the method. For instance, for each scale index j, if there is an index $k_j^0$ such that for any $k \geq k_j^0$, the wavelets $\psi_{j,k}$ have the same shape, and the dual wavelets $\tilde{\psi}_{j,k}$ have the same shape, i.e.:

$$\psi_{j,k}[n]=\psi_{j,k_j^0}[n-2^j(k-k_j^0)]$$

$$\tilde{\psi}_{j,k}[n]=\tilde{\psi}_{j,k_j^0}[n-2^j(k-k_j^0)]$$

and then also $d_{j,k}[n]=d_{j,k_j^0}[n-2^j(k-k_j^0)]$.

The computational cost of the reconstruction is reduced by replacing the formula (2) with:

$$s[t] = \sum_{j=1}^{J} \left( \sum_{k=k_j}^{k_j^0-1} d_{j,k} * \hat{\psi}_{j,k}^d[t] + d_{j,k_j^0} * \hat{\Psi}_{j,k_j^0}^d[t] \right)$$

where $$\hat{\Psi}_{j,k_j^0}^d[t] = \hat{\psi}_{j,k_j^0}^d[t] \times \sum_{l=0}^{K_j-k_j^0} W[t-2^j l].$$

The window $$\sum_{l=0}^{K_j-k_j^0} W[t-2^j l]$$

appearing in this formula is a sum of non-negative translates of the original window W. A translate of a discrete window function W[t] is defined as a function W[t−τ] with τ integer. The translation is said to be nonnegative when τ≥0. In the above mentioned embodiment, each τ is of the form $l \times 2^j$.

The Spatial Subband Transform and its Inverse

The spatial subband transform (202) and its inverse (303) are chosen among the large choice of linear invertible spatial subband transform of 2D images, a description of which can be found in "A Wavelet Tour of Signal Processing" by Stéphane Mallat, Academic Press, 1999, ISBN 0-12-466606-X. Both transforms are applied on a video signal or on a set of subband transform coefficients frame by frame, so they are both causal.

In an embodiment, the subband transform used is an orthogonal or biorthogonal 2-dimensional wavelet transform which is a tool well known to those skilled in the art. This wavelet transform is obtained with a combination of filtering and subsampling steps. The corresponding inverse wavelet transform is a combination of oversampling and filtering steps.

In yet another embodiment, the subband transform is an orthogonal or biorthogonal wavelet packet transform. It is apparent to those skilled in the art that a large number of variations is possible, including multiwavelet subband transforms, boundary wavelets, and that these variations can be applied to the present invention without departing from its scope.

In yet another embodiment, the subband transform is made redundant by essentially removing some or all of the subsampling operators and upsampling the filters in the spatial subband transform and the reconstruction filters in the inverse subband transform accordingly. This is the "à trous" algorithm of the dyadic wavelet transform or the dyadic wavelet packet transform.

In a yet another embodiment, the subband transform is a bandlet transform, as described in "Sparse Geometric Image Representation with Bandlets", Erwan Le Pennec, Stéphane Mallat, IEEE Trans. on Image Proc. vol. 14, no. 4, pp. 423-438, April 2005.

These spatial subband transforms take in input an image i[n] of size $N_1 \times N_2$ and output through a combination of filtering and subsampling operations a set of spatial subband coefficients $w_l[m]$ indexed by a scale/orientation index l and a position index m. The index l is related to the sequence of filtering and subsampling steps that have been used to compute said spatial subband coefficient. In the case of a biorthogonal wavelet transform, l carries the scale information j and a subband number information o=1 ... 3.

The inverse spatial subband transform takes in input a set of spatial subband coefficients $w_l[m]$ and recovers the image i[n] with various combinations of oversampling and filtering operations.

Non Linear Processors

The causal spatio-temporal non linear processor (104) and the spatial non linear processor (302) modify respectively the spatio temporal subband images (103) of coefficients $c_{l,j,k}[m,t]$ and the spatial subband images output by the delay d inverse time wavelet transform (105) of coefficients $w_l[m,t]$. These non-linear processors can be any state of the art noise removal or blur removal or sharpening coefficient based methods, or any combination thereof. Such methods include, but are not limited to, a combination of a thresholding operator for the noise removal and a sharpening for the blur removal or local contrast enhancement.

In an exemplary embodiment of the causal spatio-temporal nonlinear processor (104), a noise removal method is implemented with a hard thresholding operator with a threshold T, specified by the user or estimated by any state of the art method, that computes a $\tilde{c}_{l,j,k}[m,t]$ from $c_{l,j,k}[m,t]$ according to $$\tilde{c}_{l,j,k}[m,t] = \begin{cases} 0 & \text{if } |c_{l,j,k}[m,t]| \leq T \\ c_{l,j,k}[m,t] & \text{otherwise.} \end{cases}$$

Typically T is chosen as $3\sigma$ where $\sigma$ is an estimation of the standard deviation of the noise present in the signal.

In another embodiment, the hard thresholding operator is replaced with a more general thresholding operator $\rho_T$ indexed by a threshold T and the nonlinear processor computes $$\tilde{c}_{l,j,k}[m,t] \rho_T(c_{l,j,k}[m,t]).$$

In this invention, the thresholding operator can be any state of the art hard or soft thresholding operator.

In another embodiment, the value of $\tilde{c}_{l,j,k}[m,t]$ does not only depend on the value of $\tilde{c}_{l,j,k}[m,t]$ but also on the values of a spatio-temporal neighborhood. Any state of the art neighborhood based method can be used in this invention, provided that the neighborhoods used are causal.

In an exemplary embodiment, the spatial non linear processor (302) is a sharpening operator using the following non linear processing on each coefficients. An amplification parameter $\alpha$, typically larger than 1 and an attenuation parameter $\beta$, typically smaller than 1 are chosen and the enhanced spatial subband coefficient is computed from the values of the spatial subband coefficient $w_l[m,t]$ and its parent in the subband transform $w_{l'}[m',t]$ according to:

$$\tilde{w}_l[m,t] = \begin{cases} w_l[m,t] & \text{if } |w_l[m,t]| > \beta|w_{l'}[m',t]| \\ \alpha w_l[m,t] & \text{otherwise.} \end{cases}$$

In the case of orthogonal or biorthogonal wavelets, the indexes l', m' of the parent coefficient of $w_l[m,t]$ are defined if $l=(j,n)$ as $l'=(j+1,n)$ and $m'=\lfloor m/2 \rfloor$.

Either processor can be a combination of a thresholding operator and a sharpening operator. Furthermore, the parameters may vary depending on the scale/direction index l without departing from the spirit of the invention. Theses parameters can also be modified locally with the help of an external map specifying a region of interest in the video or a more general segmentation. Also, when processing color video images, each channel can be processed with different nonlinear operators. In addition, the parameters used to process a given channel may depend on the actual value of coefficients in a different channel without departing from the spirit of the invention either.

In general, the spatio-temporal nonlinear processor (104) is causal, which means that the nonlinear processing is performed on the spatio-temporal subband image coefficients independently on each coefficient, or using values in a spatio-temporal neighborhood of each coefficient, provided that the neighborhood is causal. It is apparent to those skilled in the art that it is also possible to devise methods with non causal neighborhoods introducing an additional delay d' in a then non-causal spatio-temporal non-linear processor (104), and that the resulting delay of the entire video enhancement method depicted in FIG. 1 is then d+d' instead of simply d. Such embodiments equally lie within the scope of the present invention.

Time Wavelet Transform with Haar Wavelets and Multiscale Averaging

In a preferred embodiment, the wavelet used in the causal time wavelet transform (201) and its delay d inverse (301) is the Haar wavelet. This choice allows an efficient process with a small number of operations per pixel that requires a moderate amount of image buffer or image "shift registers".

The causal Haar wavelet family with scale J is the set of functions $\{\psi_{j,k} : 1 \leq j \leq J \text{ and } 0 \leq k < 2^{J-j}\} \cup \{\psi_{J,-1}\}$ where for $k \geq 0$ $$\psi_{j,k}[n] = \begin{cases} \dfrac{1}{2^{j/2}} & \text{if } k \leq n2^{-j} < k+1/2 \\ -\dfrac{1}{2^{j/2}} & \text{if } k+1/2 \leq n2^{-j} < k+1 \\ 0 & \text{else} \end{cases}$$

and for $k \geq 0$ $$\psi_{j,-1-k}[n] = \begin{cases} \dfrac{1}{2^{j/2}} & \text{if } k \leq n2^{-j} < k+1 \\ 0 & \text{else.} \end{cases}$$

With $\hat{\psi}_{j,k}[t] = \psi_{j,k}[-t]$, the reconstruction property (1) is satisfied for any delay $d<2^J$. The reconstruction filter family $\{\hat{\psi}_{j,k}^d\}$ is then defined for a given delay d and the window $$W = \frac{1_{[-d,0]}}{d+1} \text{ by}$$

$$\hat{\psi}_{j,k}^d[t] = \begin{cases} \dfrac{1}{d+1}\psi_{j,k}[-t] & \text{if } -d \leq t \leq 0 \\ 0 & \text{otherwise.} \end{cases}$$

The causal multiscale wavelet family is redundant as $\psi_{j,k}[t] = \psi_{j,0}[t-k2^j]$ for $j \leq J$ and $k \geq 0$. In a preferred implementation, the causal multiscale wavelet family is reduced to $\{\psi_{j,0}\}_{j=1,\ldots,J} \cup \{\psi_{J,-1}\}$ while the reconstruction filter family is reduced to $\{\hat{\psi}_{j,0}{}^d\}_{j=1,\ldots,J} \cup \{\hat{\psi}_{J,-1}{}^d\}$ where $$\hat{\psi}_{j,k}^d[t] = \hat{\psi}_{j,k}[t] \times \sum_{l=0}^{div(d,2^j)} W[t-l2^j]$$

with div the Euclidean division operatori, i.e. div(a,b)=⌊a/b⌋.

As the $\hat{\psi}_{j,k}$ are supported in $[-2^j+1,0]$, $\hat{\psi}_{j,k}{}^d$ can be expressed as $$\hat{\psi}_{j,k}^d[t] = \hat{\psi}_{j,k}[t] \times \gamma(t,d,j)$$

with $$\gamma(t,d,j) = \begin{cases} \frac{1}{d+1}(div(d,2^j) + 1_{-t<rem(d,2^j)}) & \text{if } -2^j < t \le 0 \\ 0 & \text{otherwise} \end{cases}$$

with div and rem respectively the Euclidean division and remainder operators, i.e. div(a,b)=⌊a/b⌋ and rem(a,b)=a−b×⌊a/b'.

In a preferred embodiment, the causal time Haar wavelet transform is implemented in an efficient way with the use of a multiscale averaging transform computed with a hierarchical averaging method. This method reduces the number of images to be read or written as well as the number of operations per pixels in the causal time wavelet transform. It requires a buffer of $2^J-2$ multiscale average images in which only J images are used at each time t and only one past video image v(n,t−1). This buffer has to be compared with the $2^J-1$ past images to be buffered and used in the direct convolution implementation. As the time wavelet transform and its inverse operate independently of the spatial coordinate n, this coordinate will be omitted in the description below. The buffer of values that need to be stored is illustrated in FIG. 8 for a causal time Haar wavelet transform which is used in conjunction with a delay-2 inverse time Haar wavelet transform.

In essentially the same way as in FIG. 4-7, each upper half of a dot represents a wavelet coefficient or a register to store a wavelet coefficient. As opposed to more general wavelet transforms, the Haar wavelets all have the same shape, so $\psi_{j,k}[t]=\psi_{j,0}[t-2^j k]$ for $k\ge 0$, and $d_{j,k}[t]=d_{j,0}[t-2^j k]$. Thus, wavelet coefficients $d_{j,k}[t]$ for different values of t (and non-negative k) need not be shifted vertically (unlike in FIG. 5) for different values of t and identical $t-2^j k$ since $d_{j,k}[t]$ only depends on j and $t-2^j k$ and is thus equal to $d_{j,0}[t-2^j k]$.

To compute the Haar wavelet coefficients $d_{j,0}[t]$ and $d_{J,-1}[t]$, a family of intermediate multiscale average $a_j[t]$ are introduced. They corresponds to the scaling function coefficients of the Haar wavelet construction and are defined by $$a_j[t] = \left(s * \left(\frac{1}{2^{j/2}} 1_{[0,2^j-1]}\right)\right).$$

Figure 8:
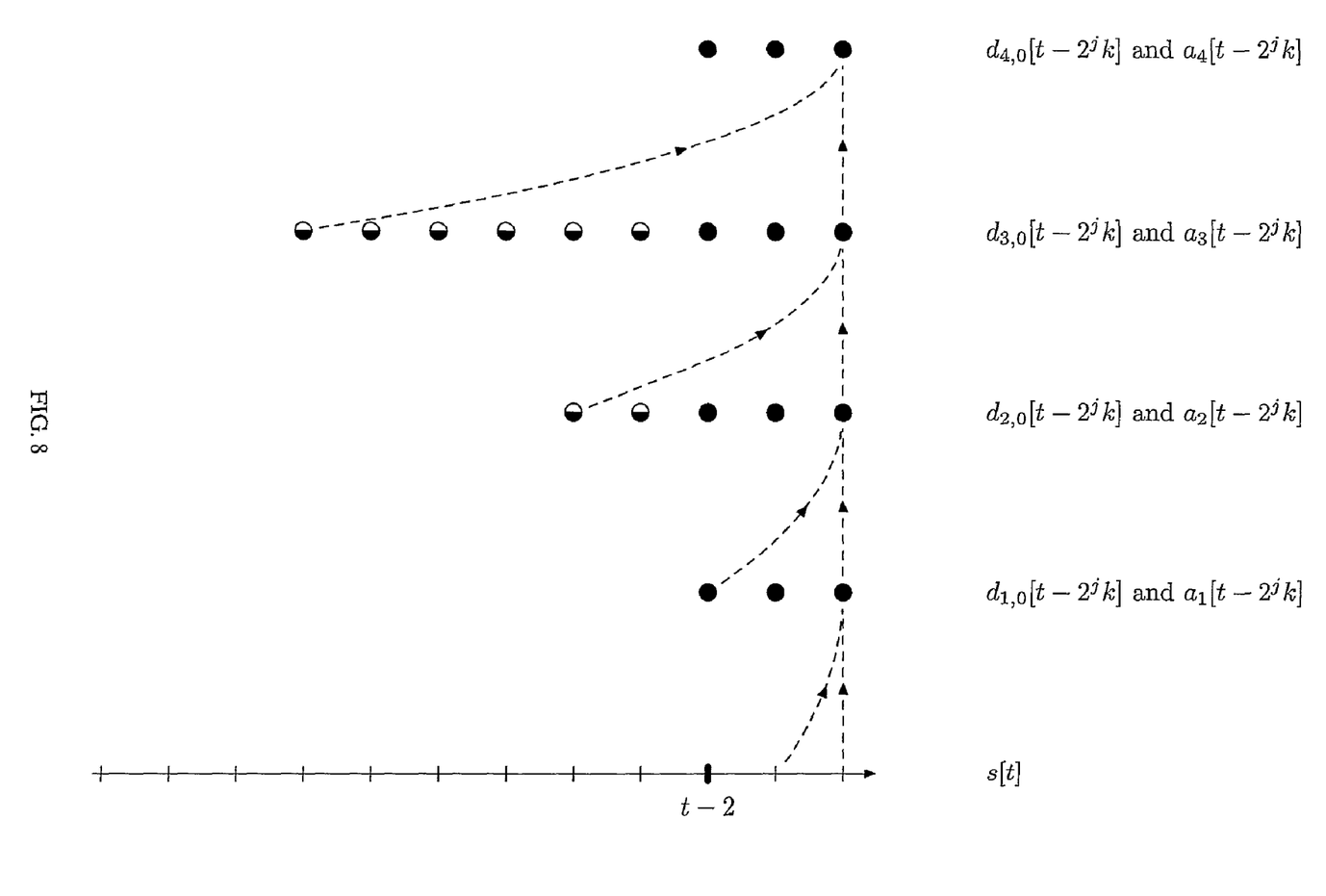
FIG. 8 illustrates the efficient hierarchical time wavelet transform proposed for the Haar wavelet.

These multiscale average coefficients are represented by the lower half of the dots in FIG. 8. In this figure, the dots represent thus both a time wavelet coefficient as well as a multiscale average coefficient. Whenever the upper half of a dot is black, a wavelet coefficient $d_{j,0}[t-2^j k]$ is stored in the corresponding register. Whenever the lower half of a dot is black, a multiscale average coefficient $a_j[t-2^j k]$ is stored in the corresponding register. A fully black dot means that the corresponding register contains both a wavelet coefficient $d_{j,0}[t-2^j k]$ and the corresponding multiscale average coefficient $a_j[t-2^j k]$. Also note that $d_{J,-1}[t]=a_J[t]$.

Each time t a new frame at t is input, all wavelet coefficients $d_{j,k}[t]$ and multi-scale average coefficients $a_j[t]$ have to be computed using the new sample s[t]. They are computed with a recursive process. Each current time multiscale average is obtained as a weighted average of two current time multiscale average and a past multiscale average read from a buffer both of the next finer scale, or of a current time input frame and a past input frame read from a buffer:

$$a_1[t] = \frac{s[t] + s[t-1]}{\sqrt{2}}$$

and for $j \in [1, J-1]$ $$a_{j+1}[t] = \frac{a_j[t] + a_j[t-2^j]}{\sqrt{2}}.$$

The multiscale wavelet coefficients are then computed as weighted differences of two current time multiscale averages or as a weighted difference of a current time input frame and a multiscale average:

$$d_{1,0}[t]=\sqrt{2}s[t]-a_1[t]$$

and for $j \in [1,J-1]$, $$d_{j+1,0}[t]=\sqrt{2}a_j[t]-a_{j+1}[t].$$

The last wavelet coefficient $d_{J,-1}[t]$ is equal to $a_J[t]$.

The corresponding computation flow is illustrated with dashed arrows in FIG. 8. Once these coefficients are computed, $d_{j,0}[t-2] \ldots d_{j,0}[t]$ for $j=1 \ldots J$ and $d_{J,-1}[t-2] \ldots d_{J,-1}[t]$ are processed with the causal spatio-temporal nonlinear processor (104) and used to compute a reconstruction $\tilde{s}[t-2]$.

Figure 9:
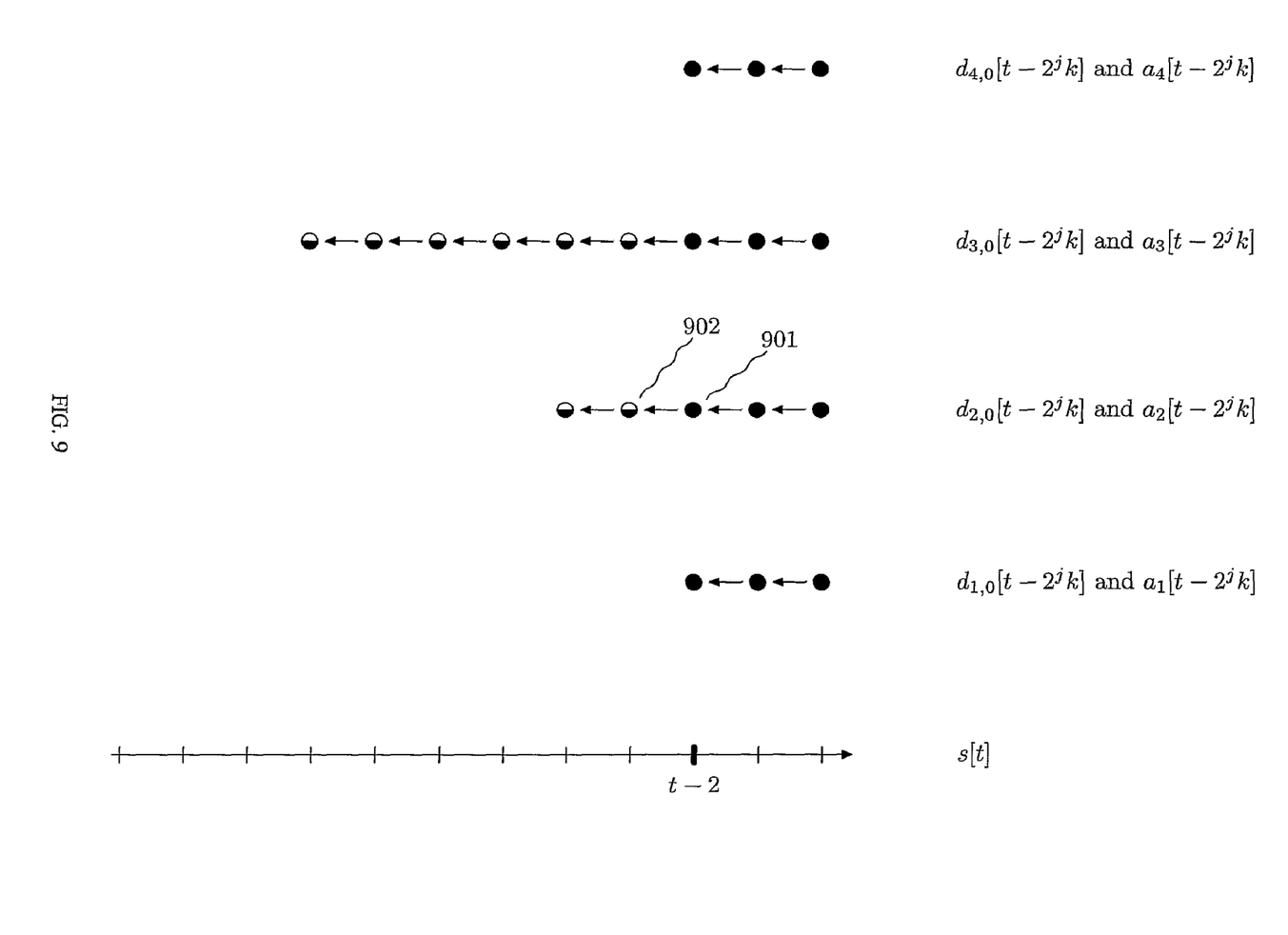
FIG. 9 illustrates the rotation of coefficient registers in an efficient hierarchical time wavelet transform proposed for the Haar wavelet.

The register shifting corresponding to incrementing the time variable t is straightforward and illustrated in FIG. 9: the arrows pointing to the left of the figure indicate how values are transferred from one register to another one. Note that when increasing the time index t to t+1, the value of $a_2[(t+1)-3]=a_2[t-2]$ is copied from the register (901) to the register (902), as this values will be reused at time t+2, while the value of $d_{2,0}[(t+1)-3]=d_{2,0}[t-2]$ stored in the register (901) at time t is dropped and not copied since it is not going to be used anymore. Various enhancements can be brought to this, like using rotating shift registers in software or hardware to reduce memory bandwidth requirements, without departing from the spirit and scope of this invention.

Furthermore, extension of this example to different values of the time delay d, the maximum scale J or different wavelet systems are apparent to those skilled in the art, and also within the scope of the present invention.

The present invention may be embodied as software run by general-purpose micro-processor or digital signal processor, in which case the modules described above with reference to FIG. 1, FIG. 2 and FIG. 3 are understood to be or form part of software modules or routines. It may also be implemented as a hardware component, for example in an ASIC or an FPGA, in which case the above-mentioned modules can form regions of the solid-state component. These embodiments of the present invention can be incorporated in various units such as a set-top box or a high definition television set that receives an interlaced SDTV video and outputs or displays an HDTV video.

Figure 10:
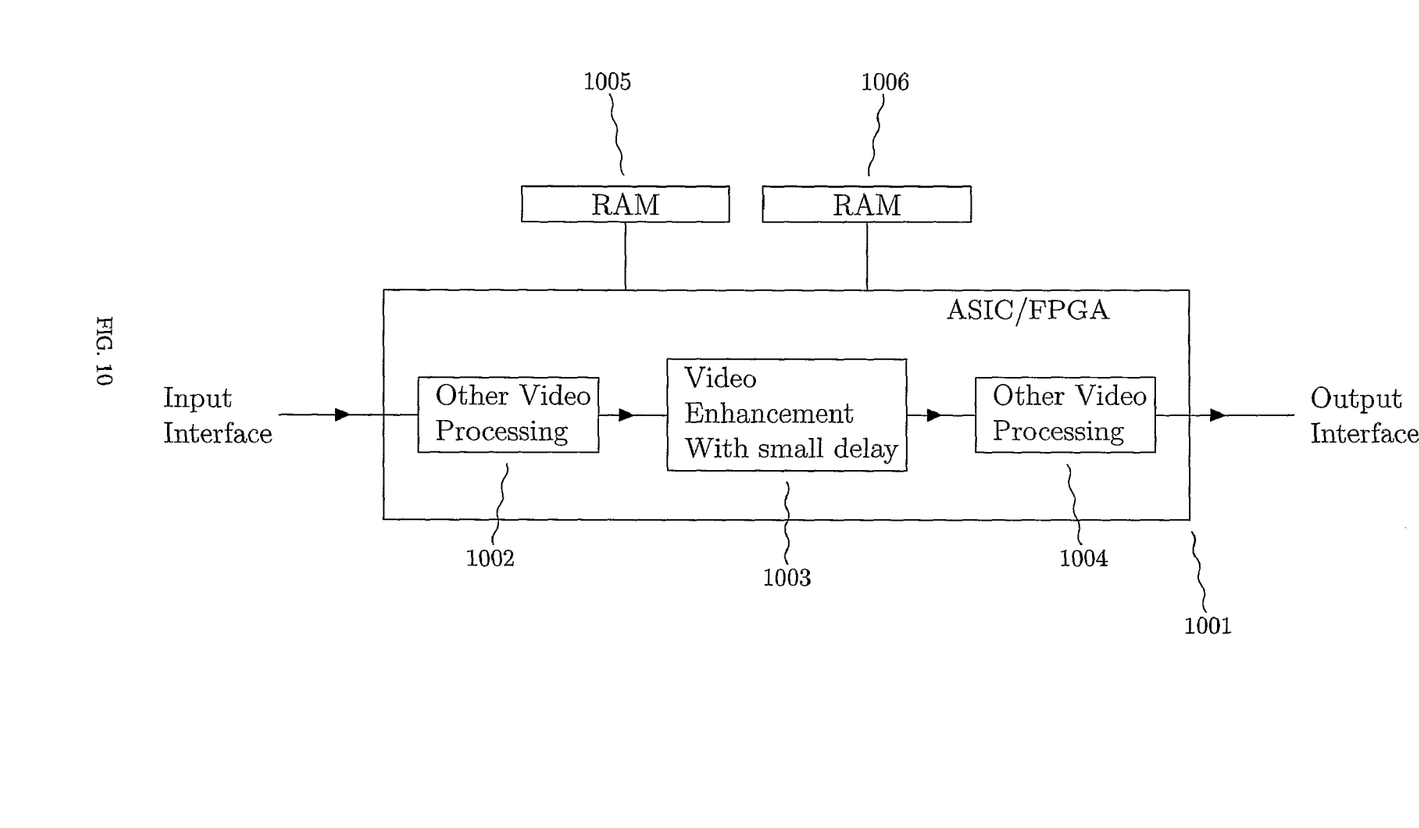
FIG. 10 illustrates a chip or chip-set comprising means for carrying out a video enhancement in a video apparatus.

FIG. 10 illustrates an exemplary embodiment of the present invention within a hardware device (examples including but not limited to ASIC, FPGA, multi-chip module, system in package or system on chip). The hardware device contains a processing block (1003) for enhancing the video stream according to the present invention, in addition to other video processing blocks (1002) and (1004), before and after the video enhancement block (1003). In an exemplary embodiment, the video processing blocks (1002), (1003) and (1004) are implemented in a single chip (1001). The chip also has video input and output interfaces, and external RAM (random access memory) devices (1005) and (1006) as temporary storage required for the video processing steps performed in (1002), (1003) and (1004). Other variants of this embodiment can be equally considered as part of the invention, with more complete video processing chips, or even system on chip devices including in addition to a block enhancing the video stream according to the present invention other blocks like video decoders, analog signal demodulators, on-screen display modules. The hardware device can then be incorporated into a video processing apparatus, a television set, a DVD-player or any other video apparatus.

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:

1. A method for enhancing a digital video stream of digital images, comprising:
   (a) transforming the digital images of the video stream into spatio-temporal subband images by processing circuitry of a video apparatus, the transforming comprising a causal time wavelet transform using filterings by multiscale causal wavelets and a spatial subband transform;
   (b) applying causal non-linear operators to said spatio-temporal subband images by the processing circuitry, to compute modified spatio-temporal subband images; and
   (c) applying to said modified spatio-temporal subband images a spatio-temporal reconstruction by the processing circuitry to compute enhanced video images delayed by a predetermined time delay of d images of the video stream, d being a non-negative integer, wherein said spatio-temporal reconstruction comprises:
      i. an inverse of said spatial subband transform; and
      ii. an inverse of said time wavelet transform using filterings with multiscale reconstruction wavelets each multiplied with either a window function of support [−d; 0], or with a sum of nonnegative translates of said window function.

2. A video enhancement method according to claim 1 wherein transforming the digital images into spatio-temporal subband images comprises:
   (a) applying said causal time wavelet transform to said digital images to compute temporal subband images; and
   (b) applying said spatial subband transform to said temporal subband images to compute said spatio-temporal subband images.

3. A video enhancement method according to claim 1, wherein said spatio-temporal reconstruction comprises:
   (a) applying said inverse time wavelet transform to said modified spatio-temporal subband images to compute spatial subband images; and
   (b) applying an inverse of said spatial subband transform to said subband images to obtain the enhanced video images.

4. A video enhancement method according to claim 1, wherein said spatio-temporal reconstruction transform comprises:
   (a) applying said inverse time wavelet transform to said modified spatio-temporal subband images to compute spatial subband images;
   (b) applying spatial non-linear operators to said spatial subband images to compute modified spatial subband images; and
   (c) applying an inverse of said spatial subband transform to said modified subband images to obtain the enhanced video images.

5. A video enhancement method according to claim 1, wherein said spatial subband transform comprises a wavelet transform.

6. A video enhancement method according to claim 1, wherein said spatial subband transform comprises a bandlet transform.

7. A video enhancement method according to claim 1, wherein said non-linear operators comprise thresholding operators.

8. A video enhancement method according to claim 1, wherein d=0.

9. A video enhancement method according to claim 1, wherein d>0.

10. A video enhancement method according to claim 1, wherein said multiscale causal wavelets comprise boundary wavelets designed for a biorthogonal wavelet transform on [0,+∞), and wherein said reconstruction multiscale wavelets comprise reversed dual boundary wavelets.

11. A video enhancement method according to claim 1, wherein said causal multiscale wavelets comprise Haar wavelets.

12. A video enhancement method according to claim 11, wherein said causal time wavelet transform comprises:
   (a) computing recursively for each scale 1 to J a multiscale average as an average of a current time multiscale average and a past multiscale average read from a buffer, or of a current time input frame and a past input frame read from a buffer;
   (b) computing time multiscale wavelet coefficients as weighted differences of two of said current time multiscale averages or as a weighted difference of a current time input frame and a multiscale average.

13. A video apparatus, comprising: processing circuitry arranged for
   (a) transforming digital images of a video stream into spatio-temporal subband images, the transforming comprising a causal time wavelet transform using filterings by multiscale causal wavelets and a spatial subband transform;
   (b) applying causal non-linear operators to said spatio-temporal subband images to compute modified spatio-temporal subband images; and
   (c) applying to said modified spatio-temporal subband images a spatio-temporal reconstruction to compute enhanced video images delayed by a predetermined time delay of d images of the video stream, d being a non-negative integer, wherein said spatio-temporal reconstruction comprises:
      i. an inverse of said spatial subband transform; and
      ii. an inverse of said time wavelet transform using filterings with multiscale reconstruction wavelets each multiplied with either a window function of support [−d; 0], or with a sum of nonnegative translates of said window function.

14. A video apparatus according to claim 13, wherein transforming the digital images into spatio-temporal subband images comprises:
  (a) applying said causal time wavelet transform to said digital images to compute temporal subband images; and
  (b) applying said spatial subband transform to said temporal subband images to compute said spatio-temporal subband images.

15. A video apparatus according to claim 13, wherein said spatio-temporal reconstruction comprises
  (a) applying said inverse time wavelet transform to said modified spatio-temporal subband images to compute spatial subband images; and
  (b) applying an inverse of said spatial subband transform to said subband images to obtain the enhanced video images.

16. A video apparatus according to claim 13, wherein said spatio-temporal reconstruction transform comprises:
  (a) applying said inverse time wavelet transform to said modified spatio-temporal subband images to compute spatial subband images;
  (b) applying spatial non-linear operators to said spatial subband images to compute modified spatial subband images; and
  (c) applying an inverse of said spatial subband transform to said modified subband images to obtain the enhanced video images.

17. A video apparatus according to claim 13, wherein said causal multiscale wavelets comprise Haar wavelets.

18. A video apparatus according to claim 17, wherein said causal time wavelet transform comprises:
  (a) computing recursively for each scale 1 to J a multiscale average as an average of a current time multiscale average and a past multiscale average read from a buffer, or of a current time input frame and a past input frame read from a buffer;
  (b) computing time multiscale wavelet coefficients as weighted differences of two of said current time multiscale averages or as a weighted difference of a current time input frame and a multiscale average.

19. A non-transitory machine-readable medium having stored therein a computer program product, wherein the program product comprises instructions to carry out the following when said program product is run in processing circuitry of a video apparatus:
  (a) transforming digital images of a video stream into spatio-temporal subband images, the transforming comprising a causal time wavelet transform using filterings by multiscale causal wavelets and a spatial subband transform;
  (b) applying causal non-linear operators to said spatio-temporal subband images to compute modified spatio-temporal subband images; and
  (c) applying to said modified spatio-temporal subband images a spatio-temporal reconstruction to compute enhanced video images delayed by a predetermined time delay of d images of the video stream, d being a nonnegative integer, wherein said spatio-temporal reconstruction comprises:
    i. an inverse of said spatial subband transform; and
    ii. an inverse of said time wavelet transform using filterings with multiscale reconstruction wavelets each multiplied with either a window function of support $[-d; 0]$, or with a sum of nonnegative translates of said window function.

* * * * *